United States Patent [19]

Maher

[11] 4,128,299

[45] Dec. 5, 1978

[54] WAVEGUIDE OPTICAL MODULATOR

[75] Inventor: James Maher, Sodus, N.Y.

[73] Assignee: Xerox Corporation, Stamford, Conn.

[21] Appl. No.: 796,262

[22] Filed: May 12, 1977

[51] Int. Cl.² ............................ G02B 5/14; G02F 1/29
[52] U.S. Cl. .................................... 350/96.13; 350/359
[58] Field of Search .................... 350/359, 360, 96.29, 350/96.12, 96.13, 336

[56] References Cited

U.S. PATENT DOCUMENTS

| 3,625,589 | 12/1971 | Snitzer | 350/96.29 |
|---|---|---|---|
| 3,704,060 | 11/1972 | McNaney | 350/336 |
| 3,802,760 | 4/1974 | Sosnowski | 350/96.13 |
| 3,804,489 | 4/1974 | Li et al. | 350/356 |
| 3,856,378 | 12/1974 | Brandt et al. | 350/96.13 |

OTHER PUBLICATIONS

Maher, J., Schank, R. L., Pfiser, C., "Elastomeric Optical Waveguide Modulators," Applied Phys. Lett., vol. 29, No. 5, Sept. 1976, pp. 293-295.

Primary Examiner—John K. Corbin
Assistant Examiner—Rolf Hille

[57] ABSTRACT

Light propagating in a waveguide is modulated by deforming a cladding on at least one surface of the waveguide. The cladding has a thickness at least equal to the exponential depth of the evanescant field of the propagating light. A pair of electrode means is used to impress a field across the waveguide and cladding so that the cladding is deformed to a degree sufficient to interfere with the evanescant field and to modulate the propagating light.

16 Claims, 5 Drawing Figures

WAVEGUIDE OPTICAL MODULATOR

BACKGROUND OF THE INVENTION

This invention relates generally to integrated optics and, more particularly, to optical modulators and methods of modulating light propagating in a waveguide.

In integrated optics, thin film technology is employed in optical circuits and devices to achieve more efficient, more economical and minute circuitry. In integrated optic waveguides, modulators and the like, a thin optical waveguide in the form of a light-propagating thin film, which may be only a few microns in thickness, is supported on a substrate. In order to propagate light, the film must have an index of refraction greater than that of the substrate and any other material in contact with the film, such as air. When this condition occurs, light entering the film will be reflected between the film surfaces and retained in and guided along the film.

It is advantageous to modulate the light propagating through the waveguide film in some aspect, for example, intensity, mode, frequency, etc. Such modulation varies some characteristic or property of the light that is discharged from the waveguide film so that it may carry information. Thus, in integrated optics, modulators are valuable in many applications.

Several useful types of optical modulators are presently known. One such type achieves optical modulation by mode defraction. Mode defraction is accomplished by passing acoustic sound waves, either bulk or sheer, through the waveguide. Alternatively, when the waveguide is a piezoelectric material, mode defraction is accomplished by passing an electric current through the waveguide. The current causes sufficient movement of the waveguide to achieve mode defraction.

Another presently known type of modulation is accomplished by changing the optical path length of an optical fiber. Such a path length can be accomplished by compressing the fiber.

It is also known to accomplish modulation of light propagating in a waveguide by changing the refractive index of the guide material. This is sometimes accomplished, for example, with interdigitated electrodes. The interdigitated electrodes can be arranged to form a diffraction grating for coupling light into and out of waveguides.

Another known method of modulating light propagating in a wavelength is to change the index of refraction of a liquid crystal material overlying the waveguide. The change in refractive index is accomplished by changing the crystal orientation from the direction of propagation to normal thereto.

A more recent discovery furnishes modulation of light propagating in an elastomeric waveguide of a given cross-section by changing the cross-sectional dimension of the waveguide. The change in dimension effects modulation by mode termination. Modulation is accomplished by impressing an electric field across the elastomeric waveguide. The field is established between electrode means placed on either side of the elastomeric waveguide.

Deformation of an elastomeric waveguide is known to produce effective modulation of propagating light. However, improvements are sought which would optimize this method of modulation. Improvements are sought especially in the areas of increased frequency and reduced deformation to accomplish modulation.

PRIOR ART STATEMENT

The following list is submitted in compliance with 37 CFR 1.56 and is believed to be the closest prior art relating to the invention described below.

1. Copending, commonly assigned application U.S. Ser. No. 621,312, filed Oct. 10, 1975 by Conwell et al. relates to the modulation of light propagating in an elastomeric waveguide by changing the cross-sectional dimension of the waveguide. Changing of the cross-sectional dimension is by impressing a field across the waveguide between electrodes. Modulation is described as being by mode termination.

2. U.S. Pat. No. 3,856,378 to Brandt et al. discloses modulation of light propagating in a waveguide by passing bulk or sheer acoustic sound waves through a waveguide. Modulation is also described as being accomplished by passing a current through a piezoelectric material. Modulation is described as being by mode diffraction.

3. U.S. Pat. No. 3,625,589 to Snitzer discloses changing the optical path length of an optical fiber by compressing the fiber.

4. U.S. Pat. No. 3,802,760 to Sosnowski discloses the modulations of light propagating in a waveguide by changing the orientation of a liquid crystal placed in the evanescant field of a guide. The change in orientation of the crystal changes its index of refraction to be either above or below that of the waveguide.

5. U.S. Pat. No. 3,804,489 to Li et al discloses the use of interdigitated electrodes to change the refraction index of the waveguide.

6. U.S. Pat. No. 3,704,060 to McNaney discloses a means for changing the light propagating capability of an optical fiber by electrically changing the characteristics of a cladding. The cladding is a material having an electrically controllable refractive index.

SUMMARY OF THE INVENTION

It is an object of the present invention to overcome the disadvantages of the prior art.

It is another object of this invention to improve the frequency at which light propagating in elastomeric waveguides can be modulated.

It is also an object of this invention to reduce the deformation required for modulating light propagating in elastomeric waveguides.

It is a further object of this invention to apply the advantages of light modulation by elastomer deformation to non-deformable waveguides.

It is yet a further object of the present invention to modulate light propagating in a waveguide responsive to an electric field being impressed across the waveguide.

It is also an object of this invention to disclose an apparatus for modulating light propagating in a waveguide.

These and other objects are accomplished by a method for modulating light propagating in a waveguide, in which the waveguide has on at least one surface a deformable cladding of a material having a lower index of refraction than the waveguide, the cladding having a thickness at least equal to the exponential depth of the evanescant field of the propagating light, and the waveguide and cladding being positioned between a pair of electrode means. The method comprises impressing a field between the electrode means so that the cladding is deformed to a degree sufficient to interfere with the evanescant field of the propagating light. Such interference with the evanescant field modulates the light propagating in the waveguide.

An apparatus for modulating light propagating in a waveguide according to the method of the present invention comprises, generally speaking, a waveguide adapted for propagating light, the waveguide having a cladding of a deformable material. The cladding has a thickness at least equal to the exponential depth of the evanescant field of the propagating light. A pair of electrode means is adapted to impress a field across the waveguide and cladding so that the cladding is deformed to a degree sufficient to interfere with the evanescant field of the propagating light.

BRIEF DESCRIPTION OF THE DRAWINGS

The invention will be described with respect to the drawings in which.

DETAILED DESCRIPTION

Figure 1:
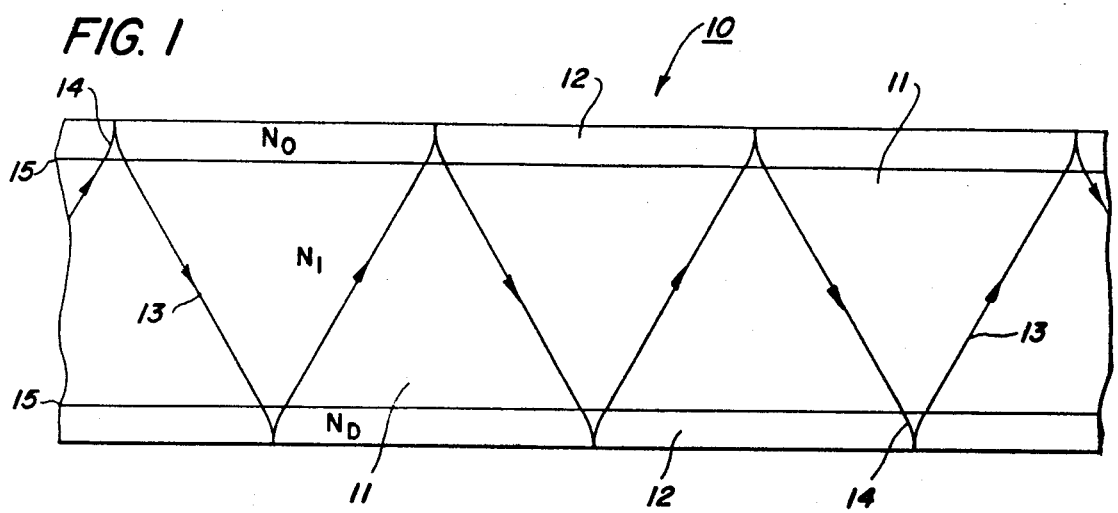
FIG. 1 shows schematically and in cross-section a waveguide having a deformable cladding.

Referring more specifically to FIG. 1, there is shown a waveguide arrangement according to the present invention, generally designated 10, which comprises a waveguide 11 having on both surfaces a cladding 12. Light propagating in the waveguide is represented by lines 13, and the evanescant field of the propagating light is represented by peaks 14.

The index of refraction $N_1$ of waveguide 11 is greater than the index of refraction $N_0$ of the cladding 12. It is well known in the integrated optics arts that the index of refraction of a waveguide must be greater than that of material on either side of it whether the adjacent material be a supporting substrate, air or a cladding such as cladding 12.

It is further known that the mechanism of reflection of a "totally internally reflected" wave includes an evanescant field. A given incident wave, instead of being reflected abruptly at interface 15 between waveguide 11 and cladding 12, penetrates into cladding 12 where it is bent back into waveguide 11. The area of penetration of the light into cladding 12 is known as the evanescant wave.

The penetration of the evanescant wave into cladding 12 is exponential, as illustrated by the shape of peaks 14. The exponential depth (or 1/e depth) of the evanescant field includes about 63 percent of the light energy, twice the 1/e field includes about 78 percent of the energy and five times the 1/e field includes about 100 percent of the energy. Thus, a cladding 12, five times the 1/e depth will result in "total internal reflection" of 100 percent of the propagating light 13, while a cladding 12 having a thickness equal to the 1/e depth of the evanescant field 14 results in transmission of about 63 percent of the propagating light.

Transmission of about 63 percent of the propagating light has been found to be sufficient for most integrated optics applications. Thus, it is a requirement of the present invention that cladding 12 have a thickness at least equal to the exponential depth of the evanescant field for the light propagating in waveguide 11.

The exponential depth of the evanescant field is expressed by the relationship:

$$\delta_z = \frac{\lambda_2}{\left[\left(\frac{N_1}{N_2}\right)^2 \sin^2\phi_i - 1\right]^{\frac{1}{2}}}$$

where
$\delta_z$ is the depth of penetration, $\lambda_2$ is $\frac{\lambda \text{ in air}}{2\pi}$, $N_1$ is the index of refraction of the waveguide,
$N_0$ is the index of refraction of the cladding, and
$\Phi_i$ is the incident angle.

A more complete characterization of the evanescant field can be found in Chapter 11 of *Introduction to Electromagnetic Fields and Waves*, by Carson and Lorrain; 1962; W. H. Freeman and Company, San Francisco and London.

For normally encountered wavelengths ($\lambda$) of the transmitted light, a thickness of at least about 0.1 micron is typical for cladding 12.

Waveguide 11 is formed from any suitable material. The material should be capable of propagating light, usually organized light such as laser light. Further, the material should have an index of refraction greater than that of cladding 12.

Typically, waveguide 11 is formed from such materials as glass, crystals and elastomers. Examples of such materials are Pyrex microscope glass (n = 1.513 at 632.8 nm), sodium fluoride (n = 1.39 at 632.8 nm), Corning 7059 sputtered glass (n = 1.62 at 632.8 nm), lithium niobate ($n_e$ = 2.20 and $n_o$ = 2.29 at 632.8 nm) and polydimethylsiloxane (n = 1.40–1.41 at 632.8 nm).

Cladding 12 can be formed from any suitable deformable material having an index of refraction of less than that of waveguide 11. Typically, cladding 12 is formed from an elastomer. Examples of useful elastomers for cladding 12 are polydimethylsiloxane, 25 mol. percent polyphenylmethylsiloxane (n = 1.48 at 632.8 nm) and 50 mol. percent polyphenylmethylsiloxane (n = 1.54 at 632.8 nm).

Examples of typical combinations of waveguide 11 and cladding 12 to form waveguide arrangement 10 are a Corning 7059 sputtered glass waveguide with a polydimethylsiloxane (PDMS) cladding, a 25 mol. percent polyphenylmethylsiloxane (PPMS) waveguide with a PDMS cladding, and a 50 mol. percent PPMS waveguide with a 25 mol. percent PPMS cladding.

Figure 2:
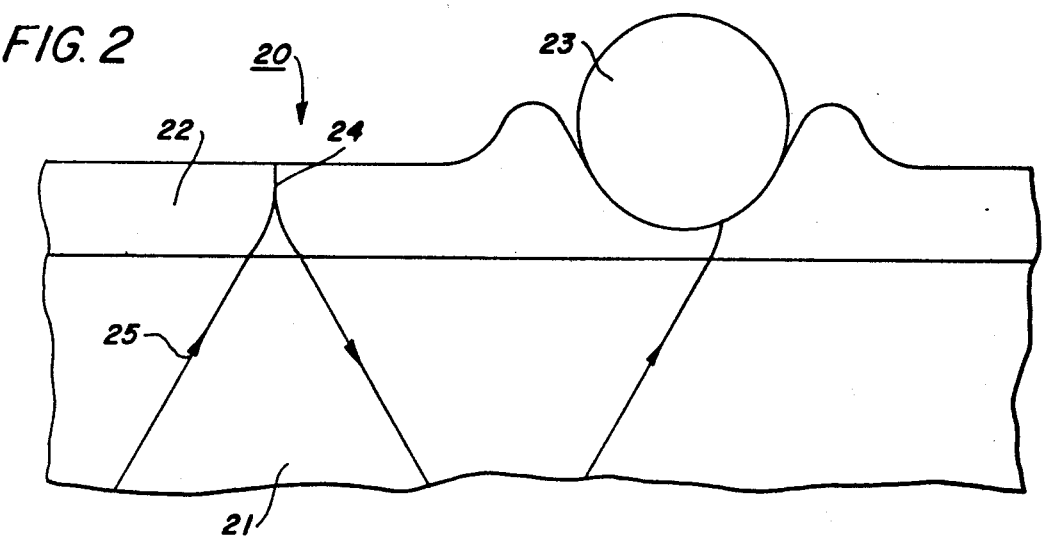
FIG. 2 shows schematically and in cross-section a portion of the waveguide of FIG. 1 in which an electrode means has deformed the cladding to interfere with the evanescant field.

Referring more specifically to FIG. 2, there is shown a portion of the waveguide in which propagating light is modulated according to the present invention. Waveguide arrangement 20 comprises a waveguide 21 and a cladding 22 as described in connection with FIG. 1.

Cladding 22 is deformed by filament 23. The deformation interferes with the evanescant field 24 of propagating light 25 so that propagation is modulated.

Modulation by interference with the evanescant wave in a deformable cladding according to the present invention has the advantage of requiring less deformation to modulate the propagation than previously known modulation-by-deformation techniques such as that described by Conwell et al. in copending application U.S. Ser. No. 621,312, filed Oct. 10, 1975. This results in a high frequency of modulation being possible.

The desire for high frequency modulation results in relatively thin claddings in the present invention. As discussed in connection with FIG. 1, the cladding must be at least as thick as the exponential depth of the evanescant field of the propagating light. The maximum thickness of cladding 22 is limited only by practical considerations. However, because high frequency modulations are usually desirable, thinner claddings are most frequently used. Typically, claddings have a thickness of not more than about 1 micron.

Filament 23 can be any suitable element of an electrode means for deforming the cladding. Filament 23 should have a shape and size to be effective for deforming the cladding. Useful electrode means are described in greater detail in connection with FIG. 3.

Figure 3:
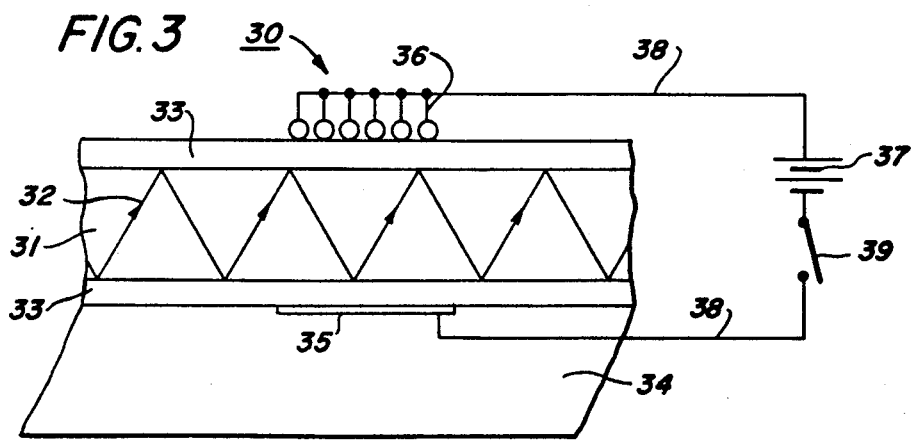
FIG. 3 shows schematically and in cross-section a waveguide having deformable cladding on both surfaces and being supported on a substrate.

Referring more specifically to FIG. 3, there is shown an apparatus, generally designated 30, for modulating light propagating in waveguide according to the method of the present invention. The apparatus includes a waveguide 31 having light 32 propagating therethrough.

Waveguide 31 has on both surfaces a deformable cladding 33. One cladding 33 is supported by substrate 34.

A pair of electrode means is positioned to impress a field across the cladding and waveguide when a voltage is applied. A first electrode means 35 of the pair is positioned between cladding 33 and substrate 34.

Electrode means 35 can be any suitable electrode and is typically a conductive metal, such as gold, silver or aluminum, plated onto cladding 33.

Second electrode means 36 is a plurality of electrically connected filaments positioned substantially perpendicular to the direction of propagating of light 32. Electrode means 36 could be only one filament (such as filament 23 of FIG. 2) or could be any electrode means of a size and shape suitable for deforming deformable cladding 23, as explained in connection with FIG. 4. The array of filaments depicted in FIG. 3 is preferred because it provides deformation over a relatively wide area of cladding with a minimum of movement.

The filaments may be formed from any conductive material which has suitable tensile strength. Good results are obtained with tungsten filaments.

Second electrode 36 and first electrode 35 are connected to power source 37 through circuit 38. Switch 39 in the circuit is shown in an open position so that in FIG. 3 a field is not impressed across cladding 33 and waveguide 31. Propagating light 31 is not modulated.

Figure 4:
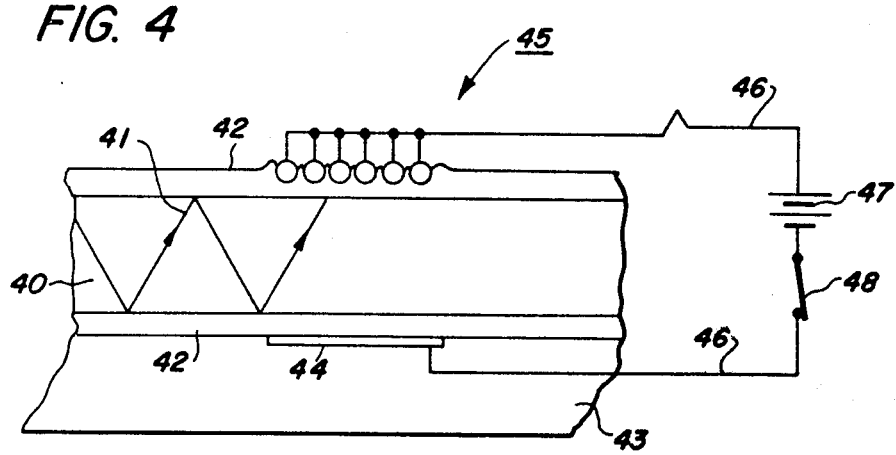
FIG. 4 shows schematically and in cross-section the waveguide of FIG. 3 in which the cladding is deformed by the electrode means.

Referring more specifically to FIG. 4, there is shown an arrangement similar to that in FIG. 3. Waveguide 40 has light 41 propagating in it. Waveguide 40 has cladding 42 on both surfaces, and one surface is supported on substrate 43.

A pair of electrode means including first electrode means 44 and second electrode means 45 are positioned so as to impress a field across the cladded waveguide when a voltage is applied. The electrodes are connected by circuit 46 to power source 47 through switch 48 which, in this embodiment, is closed.

It is seen in FIG. 4 that cladding 42 is deformed by second electrode means 45 in an amount sufficient to interfere with the evanescent field of propagating light 41, and the propagation is modulated.

Switch 48 can be opened and shut by hand or by any other suitable means. For example, switch 48 can be controlled by output from a computer, an optical scanning device, or the like. Likewise, power supply 47 and switch 48 can be a part of such a computer or scanning device.

Figure 5:
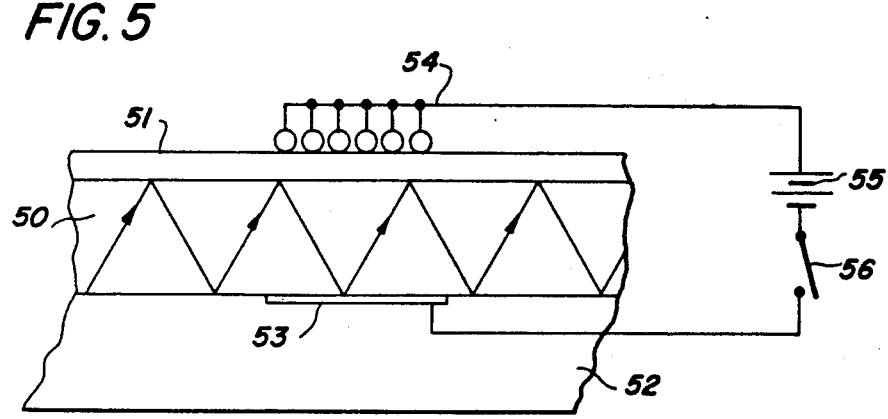
FIG. 5 shows schematically and in cross-section a waveguide supported on a substrate and having a deformable cladding on only one side.

Referring more specifically to FIG. 5, there is shown an alternative embodiment of the apparatus of the present invention. In FIG. 5, waveguide 50 has cladding 51 on only one surface. The surface opposite cladding 51 contacts substrate 52, and first electrode means 53 is plated onto waveguide 50. Second electrode means 54, power source 55, and switch 56 are substantially as described in connection with the corresponding parts of the embodiment of FIG. 4.

The best mode of making and using the waveguide modulator of the present invention will now be described by way of examples with sufficient detail and clarity to enable one skilled in the art to make and use the invention.

EXAMPLE I

A Corning 7059 sputtered glass strip is used as a waveguide. The strip has a thickness of about 6 microns and an index of refraction of 1.62 at 632.8 nm.

The strip is prepared by vacuum coating an electrode across one side of the strip near its center. The electrode is a 300 Å thick gold layer. The strip is placed against a Pyrex microscope slide (n = 1.513 at 632.8 nm) which acts as a supporting substrate. The sputtered glass strip is positioned on the substrate so that the gold electrode lies between the substrate and the waveguide.

The opposite side of the waveguide is coated with a 0.1 micron cladding of PDMS elastomer, leaving an uncoated area at either end of the strip. The cladding is formed by dip coating the waveguide in a 5 percent by weight solution of PDMS gum stock in benzene.

A 1 mil. diameter tungsten wire which is fixed in an insulating yoke is positioned across the elastomeric cladding parallel with the gold electrode. The gold electrode and the tungsten wire electrode are connected to either side of a 150 v. D.C. power source through a switch which remains open.

Schott SF18 glass prisms (30°/60°) are placed on the sputtered glass waveguide in the uncoated areas near either end to provide an entry and exit path for high intensity light. High intensity light having a wavelength of 632.8 nm. is generated by an HeNe laser and directed into the entry prism. It is observed to propagate through the waveguide and to exit through the exit prism unmodulated. The switch is closed and the propagating light is observed to be modulated (lessened in intensity).

EXAMPLE II

The construction of Example I is repeated except that the cladding layer is about 1.0 micron thick. No change in the operation of the apparatus is observed.

EXAMPLE III

The construction of Example I is repeated except that a plurality of parallel tungsten filaments comprise the second electrode. When the switch is closed, the construction of Example III provides more complete attenuation of the propagating light than do the constructions of Examples I and II.

EXAMPLE IV

The construction of Examples I, II and III are adapted so that the switch of each apparatus is automatically opened and shut by a Model OPS 2000 variable oscillator available from KEPCO. The switch is opened and closed at various frequencies up to about 20 K Hz. At frequencies about about 10 K Hz. the construction of Example II produces slightly less distinct modulation than the constructions of Examples I and III. In all cases, the embodiment of Example III produces more complete attenuation of the propagating light.

EXAMPLE V

A waveguide construction is formed in which the waveguide is a 6 micron film of crosslinked 25 mol. percent PPMS elastomer coated onto a Pyrex microscope slide substrate.

Prior to dip coating the elastomer waveguide on the slide, a 1,000 Å silver electrode strip is evaporated onto the slide across its width at about its center.

A PDMS elastomer is prepared and coated onto the waveguide to form a cladding having a thickness of about 0.5 micron. The cladding is dip coated from a 5 percent by weight solution of PDMS gum stock in benzene.

The construction is completed as in Example III and is tested as described in Examples I and IV. The procedure of Example IV is modified in that the frequency is increased to 150 K Hz. Crisp modulation is observed at frequencies up to about 100 K Hz.

EXAMPLE VI

The construction of Example V is modified so that a 0.5 micron cladding of the PDMS elastomer is placed between the slide and the waveguide as well as between the slide and the filament electrode. This construction is tested according to the procedure of Example V and no significant difference in behavior is noted.

EXAMPLE VII

A Pyrex microscope slide is prepared by evaporating a 1000 Å silver strip across its width at about its center. The electrode side of the slide is coated with a 6 micron film of 50 mol. percent PPMS which serves as a waveguide. The PPMS layer is coated with a 0.5 micron cladding of 25 mol. percent PPMS.

The construction is completed as in Example III and tested as in Example V with substantially the same results.

The above description and drawings will be sufficient to enable one skilled in the art to make and use the present invention and to distinguish it from other inventions and from what is old. It will be appreciated that other variations and modifications will occur to those skilled in the art upon reading the present disclosure. These are intended to be within the scope of this invention.

What is claimed is:

1. A method for modulating light propagating in a waveguide, the waveguide having on at least one surface a deformable cladding of a material having a lower index of refraction than the waveguide, the cladding having a thickness at least equal to the exponential depth of the evanescent field of the propagating light, the waveguide and cladding being positioned between a pair of electrode means, the method comprising impressing a field between the electrode means in order to attract the electrodes towards each other so that the cladding is deformed to a degree sufficient to interfere with the evanescent field of the propagating light, whereby propagation of the light is modulated.

2. The method of claim 1 wherein the deformable cladding is made from an elastomeric material.

3. The method of claim 2 wherein the elastomeric material is selected from the group consisting of polydimethylsiloxane, 25 mol. percent polyphenylmethylsiloxane and 50 mol. percent polyphenylmethylsiloxane.

4. The method of claim 1 wherein the waveguide is formed from a material selected from the group comprising glass, sputtered glass and elastomeric materials.

5. The method of claim 1 wherein the thickness of the cladding varies from about 0.1 micron to about 1 micron.

6. The method of claim 1 wherein at least one of the pair of electrode means comprises a plurality of parallel, electrically connected filaments positioned to contact the cladding and oriented substantially perpendicular to the direction of the light propagation.

7. The method of claim 1 wherein the waveguide has a cladding on only one surface and the opposite surface is supported by a substrate, the electrode means opposite the cladding comprising a conductive layer between the waveguide and the substrate.

8. The method of claim 1 wherein the waveguide has a cladding on both surfaces and one cladding is supported by a substrate, the electrode means on the supported surface comprising a conductive layer between the cladding and the substrate.

9. An apparatus for modulating light propagating in a waveguide, the apparatus comprising:
   (a) a waveguide adapted for propagating light therethrough;
   (b) a deformable cladding on at least one side of the waveguide, the cladding having a thickness at least equal to the exponential depth of the evanescent field of the propagating light; and
   (c) a pair of electrode means positioned on either side of the waveguide and cladding adapted for impressing a field across the waveguide and cladding in order to attract the electrodes toward each other so that the cladding is deformed to a degree sufficient to interfere with the evanescent field of the propagating light, whereby propagation of the light is modulated.

10. The apparatus of claim 9 wherein the waveguide is formed from a material selected from the group comprising glass, sputtered glass and elastomers.

11. The apparatus of claim 9 wherein the deformable cladding is made from an elastomeric material.

12. The apparatus of claim 11 wherein the elastomeric material is selected from the group consisting of polydimethylsiloxane, 25 mol. percent polyphenylmethylsiloxane, and 50 mol. percent polyphenylmethylsiloxane.

13. The apparatus of claim 9 wherein the thickness of the cladding varies from about 0.1 micron to about 1 micron.

14. The apparatus of claim 9 wherein at least one of the pair of electrode means comprises a plurality of parallel electrically connected filaments positioned to contact the cladding and oriented substantially perpendicular to the direction of the light propagation.

15. The apparatus of claim 9 wherein the waveguide has a cladding on only one surface and the opposite surface is supported by a substrate, the electrode means opposite the cladding comprising a conductive layer between the waveguide and the substrate.

16. The apparatus of claim 9 wherein the waveguide has a cladding on both surfaces and one cladding is supported by a substrate, the electrode means on the supported surface comprising a conductive layer between the cladding and the substrate.

* * * * *